(12) United States Patent
Meidar et al.

(10) Patent No.: US 8,529,420 B2
(45) Date of Patent: Sep. 10, 2013

(54) MACHINE TOOL FOR PROCESSING WORKPIECES

(75) Inventors: Moshe Israel Meidar, New York, NY (US); Wolfgang Horn, Göppingen (DE); Bernhard Pause, Mosbach (DE); Waldemar Haus, Winnenden (DE); Joachim Krischke, Mosbach (DE); Heiner Lang, Pforzheim (DE)

(73) Assignee: MAG IAS GmbH, Göppingen (DE)

( * ) Notice: Subject to any disclaimer, the term of this patent is extended or adjusted under 35 U.S.C. 154(b) by 592 days.

(21) Appl. No.: 12/815,819

(22) Filed: Jun. 15, 2010

(65) Prior Publication Data
US 2010/0313718 A1   Dec. 16, 2010

(30) Foreign Application Priority Data

Jun. 16, 2009 (DE) .......................... 10 2009 025 009
Nov. 20, 2009 (DE) .......................... 10 2009 054 043

(51) Int. Cl.
| | |
|---|---|
| *B23Q 3/157* | (2006.01) |
| *B23Q 7/00* | (2006.01) |
| *B23Q 1/01* | (2006.01) |
| *B23Q 11/08* | (2006.01) |
| *B23C 1/06* | (2006.01) |
| *B23C 1/08* | (2006.01) |
| *B23C 1/14* | (2006.01) |

(52) U.S. Cl.
USPC ............ 483/55; 409/212; 409/235; 409/137; 409/134; 409/192; 409/168; 409/158; 409/173; 29/33 P

(58) Field of Classification Search
USPC ................. 409/202, 212, 235, 168, 173, 161, 409/198, 221, 137, 192, 203, 213, 217, 134, 409/158; 408/234; 451/361; 29/33 P, 563, 29/27 C, 27 R; 483/54–57
See application file for complete search history.

(56) References Cited

U.S. PATENT DOCUMENTS 4,621,407 A * 11/1986 Suzuki ........................... 483/56
5,340,247 A * 8/1994 Cuneo et al. .................. 409/202

(Continued)

FOREIGN PATENT DOCUMENTS

| DE | 19948822 A1 | 4/2001 |
| DE | 10029967 A1 | 1/2002 |

(Continued)

OTHER PUBLICATIONS

Machine translation of JP 2003-326431, which JP '431 was published Nov. 2003.*
EP 10 16 4497 Search Report dated Sep. 10, 2010; 1 page.

*Primary Examiner* — Erica E Cadugan
(74) *Attorney, Agent, or Firm* — Reising Ethington P.C.

(57) ABSTRACT

A machine tool for achieving a high degree of flexibility during workpiece processing comprises a machine bed with side walls arranged thereon, which respectively comprise a basic body with a front overhanging projection arranged thereon. On the side walls a tool spindle is arranged to be linearly movable by means of slides. Underneath the front overhanging projections a processing space is formed for the workpiece processing, in which a workpiece positioning unit is arranged. The processing space underneath the front overhanging projections is freely accessible, whereby depending on the processing task different workpiece positioning units can be arranged therein.

19 Claims, 14 Drawing Sheets

(56) References Cited

U.S. PATENT DOCUMENTS

| | | |
|---|---|---|
| 2001/0002380 A1 * | 5/2001 | Tominaga et al. ............... 483/55 |
| 2002/0006764 A1 | 1/2002 | Hanisch et al. |
| 2004/0121890 A1 | 6/2004 | Taga et al. |
| 2006/0270540 A1 | 11/2006 | Takayama et al. |

FOREIGN PATENT DOCUMENTS

| | | |
|---|---|---|
| EP | 0568798 A1 | 11/1993 |
| EP | 1386691 A1 | 2/2004 |
| JP | 2003-326431 A * | 11/2003 |
| WO | 02/00390 A1 | 1/2002 |

* cited by examiner

MACHINE TOOL FOR PROCESSING WORKPIECES

FIELD

The invention relates to a machine tool for processing workpieces with a machine bed, with two side walls, which are arranged to be substantially parallel to one another, which are arranged respectively with a side wall bottom side on the machine bed and which respectively have a side wall top side, with a z-slide, which is arranged in the region of the side wall top side on the side walls and which can be moved by means of a z-drive motor in a horizontal z-direction on the side walls, with an x-slide, which is arranged on the z-slide and which can be moved by means of an x-drive motor in a horizontal x-direction on the z-slide, and with a rotary-driven tool spindle for mounting a tool, which is arranged suspended on the x-slide and which can be moved by means of a y-drive motor in a vertical y-direction on the x-slide.

BACKGROUND

A machine tool of this kind is known for example from EP 0 568 798B9. Said machine tool comprises a machine basic body with two side walls arranged parallel to one another, on which a multiaxis slide is arranged movably. Onto the multiaxis slide a vertically suspended operating spindle is secured, which can be moved in vertical direction and is used for mounting workpieces or tools. A disadvantage of this machine tool is that its processing space is limited at the side by the side walls and thus during the processing of workpieces there is only a small degree of flexibility.

SUMMARY

Therefore, the underlying objective of the invention is to develop a generic machine tool such that there is a high degree of flexibility during the processing of workpieces.

The objective is achieved by means of a machine tool, in which the side walls each comprise a basic body and a front overhanging projection arranged thereon, wherein each of the front overhanging projections is in alignment with the associated basic body so that the z-slide can be moved on both, and the first free spaces lying in y-direction underneath the front overhanging projections and a second free space lying between said free spaces form a processing space, and in which in the processing space at least one workpiece positioning unit for a work-piece to be processed is arranged.

According to the invention a high degree of flexibility is achieved during the processing of workpieces, if the processing space is arranged in front of the side walls and the latter do not delimit the processing space at the side. This is achieved in that the side walls respectively comprise a basic body with a front overhanging projection arranged in alignment thereon so that the z-slide can be moved on both. The processing space for processing the workpieces is formed in y-direction underneath the front overhanging projections in front of the machine bed and the side walls. In this way the processing space is not delimited to the side in x-direction nor to the front in z-direction. The front overhanging projections can be adjusted in length in z-direction such that different workpiece positioning units can be arranged as necessary in the processing space, so that various different processing tasks can be performed by means of the machine tool according to the invention. In this case the main advantages of the portal construction can be maintained. The machine tool thus has a stable, compact and modular structure, in which all of the guides for moving the slide and the tool spindle are arranged outside the processing space and thus are protected from dirt.

A machine tool, in which each of the front overhanging projections together with the associated basic body fauns the side wall top side and the z-slide is arranged movably on the latter, allows a simple assembly of the z-slide on the basic bodies of the side walls and the associated front overhanging projections.

A machine tool, in which each of the front overhanging projections comprises a front overhanging projection bottom side and at least one of the front overhanging projection bottom sides is designed such that at least one part of the at least one workpiece positioning unit can be attached thereonto, provides an option for attaching a part of the workpiece positioning unit on the front overhanging projection bottom side of the front overhanging projections facing the machine bed. On the front overhanging projection bottom sides for example on one side or both sides workpiece mounts can be suspended so that the processing space remains freely accessible underneath the latter. In the processing space underneath the workpiece mounts additional tools can be arranged for example.

A machine tool, in which each of the front overhanging projections is designed in one piece with the associated basic body, has extremely stable side walls.

A machine tool, in which at least one of the side walls comprises at least one feed opening, enables flexible loading through at least one of the side walls. Through at least one loading opening by means of a suitable transport device tools and/or workpieces can be inserted into and/or removed from the operating space between the side walls.

A machine tool, in which each of the side walls comprises a feed opening designed to be in alignment with one another, makes it possible to guide a transport device through the operating space between the side walls. In this way tools and/or workpieces are inserted through one of the side walls and removed through the other side wall.

A machine tool, in which the side walls each comprise a support projection, and in which each of the support projections is arranged below the associated front overhanging projection in the processing space, and in which onto the support projections the at least one workpiece positioning unit is arranged, provides an option of securing the at least one workpiece positioning unit on top of the support projections. In particular, parts of the at least one workpiece positioning unit are arranged in the free spaces formed by the support projections and the associated front overhanging projections.

A machine tool, in which the at least one workpiece positioning unit is designed as a rotary-pivot bridge and a bridge drive is arranged respectively onto the support projections, enables the production of spherical workpiece surfaces. By designing the workpiece positioning unit as a rotary-pivot bridge a five-axis processing of the workpieces is made possible. The tool spindle can be moved along three linear axes in x-, y- and z-direction. In addition, a workpiece arranged on the workpiece positioning unit can be pivoted about two rotational axes. Said rotational axes are usually denoted as the A- and B-axis. A rotary-pivot-bridge of this kind is known in principle. By means of the standing ar, rangement of the bridge drives for the A-axis in the free spaces between the support projections and the front overhanging projections the processing forces acting during the processing are absorbed to an optimum degree by the side walls and the machine frame and at the same time optimum access to the bridge drives is achieved as the latter are not arranged between the side walls.

A machine tool, in which two workpiece positioning units are provided each with a positioning drive and a polygonal workpiece support arranged thereon, is highly productive and thus the piece and machine costs are low. Since two workpiece positioning units are provided, one workpiece positioning unit can be fitted, whilst the other workpiece positioning unit can process the workpieces. The workpiece positioning units are fitted on alternate sides and used for processing. Furthermore, the workpiece carrier owing to its polygonal cross section can support a plurality of workpieces.

A machine tool, in which each positioning drive is arranged onto one of the support projections and the polygonal workpiece supports extend concentrically to a horizontal pivot axis of the positioning drives into the processing space, enables the simple and rapid processing of the workpieces. In particular, the movement path between the workpiece carriers is minimized.

A machine tool, in which the workpiece carriers can be pivoted independently of one another by means of the positioning drives about a joint, horizontal pivot axis, enables a high degree of flexibility with the simultaneous processing workpieces and fitting of workpieces. The fitting can be performed independently of the processing.

A machine tool, in which on each polygon side of polygonal workpiece carriers several workpiece mounts are arranged next to one another, wherein the number of workpiece mounts per polygon side corresponds to the number of tool spindles, enables the simultaneous processing of several workpieces, whereby productivity is increased. The machine tool comprises in particular two tool spindles arranged next to one another, whereby each polygon side of the workpiece carriers has a corresponding number of workpiece mounts. The spacing between the tool spindles corresponds to the spacing between the workpiece mounts on each polygon side, so that the workpieces can be processed together uniformly in parallel.

A machine tool, in which each of the support projections is designed to be in one piece with the associated basic body, has highly rigid support projections.

A machine tool, in which a first workpiece mount is arranged in the region of one of the front overhanging projections on the associated side wall in the processing space and in which a second workpiece mount is arranged in x-direction in alignment with the first workpiece mount in the processing space, enables the processing of shaft-like workpieces. The second workpiece mount can be designed for example as a tailstock or as workpiece spindle. The shaft-like workpieces are mounted on both sides for processing in the workpiece mounts, whereby at least one of the workpiece mounts is rotary driven.

A machine tool, in which the first workpiece mount is designed as a workpiece spindle, and in which the second workpiece mount is designed as a workpiece spindle and is arranged on an x-slide and in which the x-slide can be moved on a machine bed-front side of the machine bed in x-direction, enables the processing of shaft-like workpieces of different lengths. The second workpiece spindle arranged on the x-slide can be driven depending on the length of the workpiece in x-direction. Furthermore, flange-like workpieces can be processed on both sides. For this the flange-like workpiece is mounted firstly in the first workpiece spindle and processed on a first side. For processing on a second side the workpiece is transferred to the movable second workpiece spindle. The processing space provides sufficient space for the x-slide, in order to arrange the latter in x-direction movably on the machine bed front side.

A machine tool, in which underneath the workpiece mounts a tool revolver movable in x-direction is arranged in the processing space, increases flexibility during the processing of the workpiece. Owing to the fact that the first workpiece spindle is arranged to be suspended the tool revolver can be moved underneath said workpiece spindle so that it is also possible to perform the transfer of flange-like workpieces to the second workpiece spindle.

A machine tool, in which the workpiece positioning unit is arranged on the machine bed and extends into the processing space and in which the workpiece positioning unit comprises two pivot axes, wherein one of the pivot axes runs inclined parallel to a y-z-plane and relative to the y-direction, enables a five-axis processing of workpieces. The workpiece positioning unit is designed as a twin-axis-table, in which a pivot axis in the y-z-plane is inclined relative to the y-direction. By means of the front overhanging projections the tool spindle can project far beyond the twin-axis-table in each position, so that a workpiece tensioned thereon can be processed in each position of the twin-axis table.

A machine tool, in which underneath the workpiece positioning unit a separate chip collector is arranged in the processing space, enables the simple collection of chips formed during the processing. The processing space provides sufficient space for positioning the chip collector underneath the workpiece positioning unit.

A machine tool, in which between the side walls a tool magazine is arranged, provides a tool magazine in a compact form. The operating space available between the side walls can be used easily for a tool change.

Further features, advantages and details of the invention are given in the following description of several exemplary embodiments.

DESCRIPTION OF THE PREFERRED EMBODIMENTS

Figure 1:
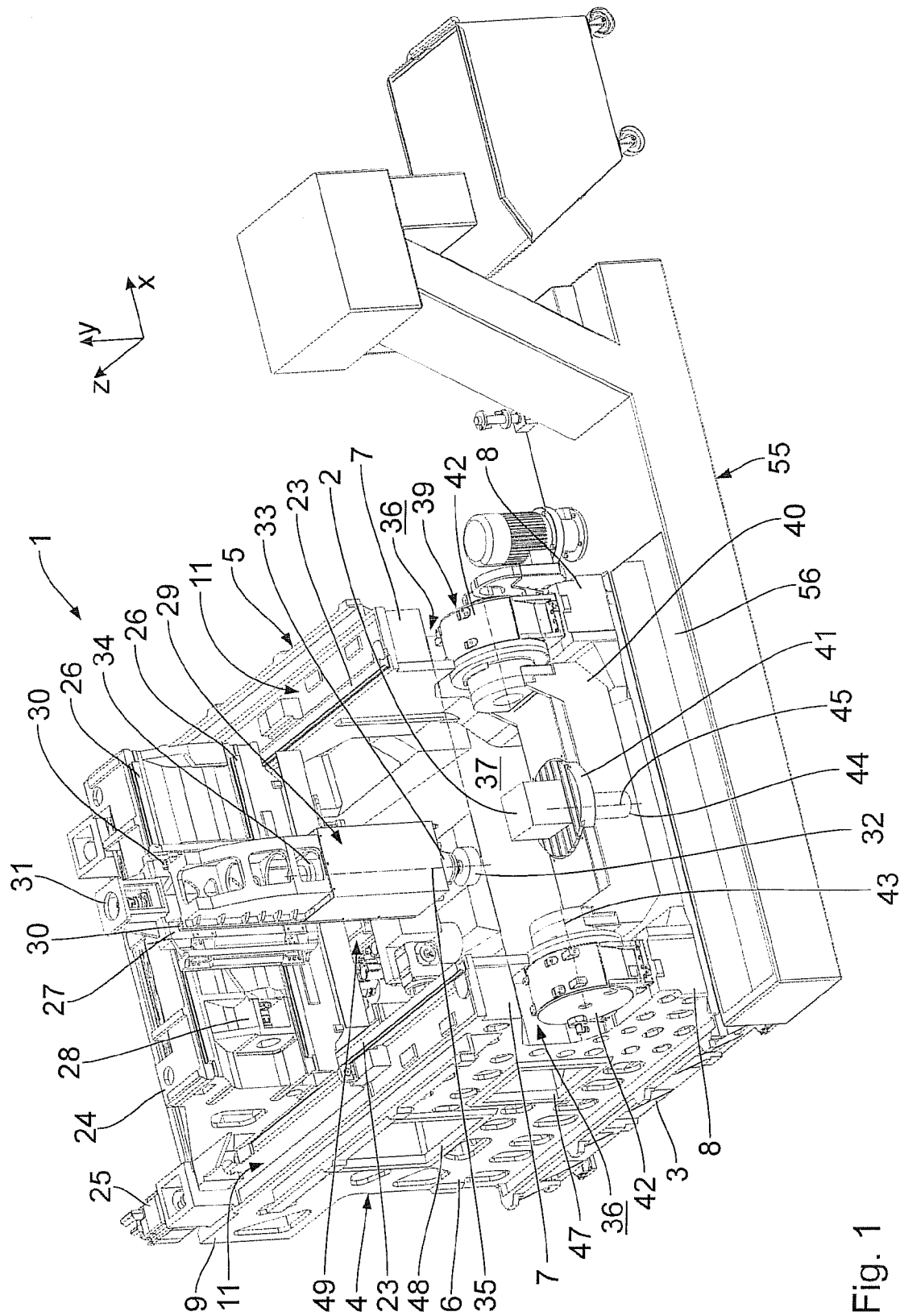
FIG. 1 shows a perspective view of a machine tool according to a first exemplary embodiment.
Figure 2:
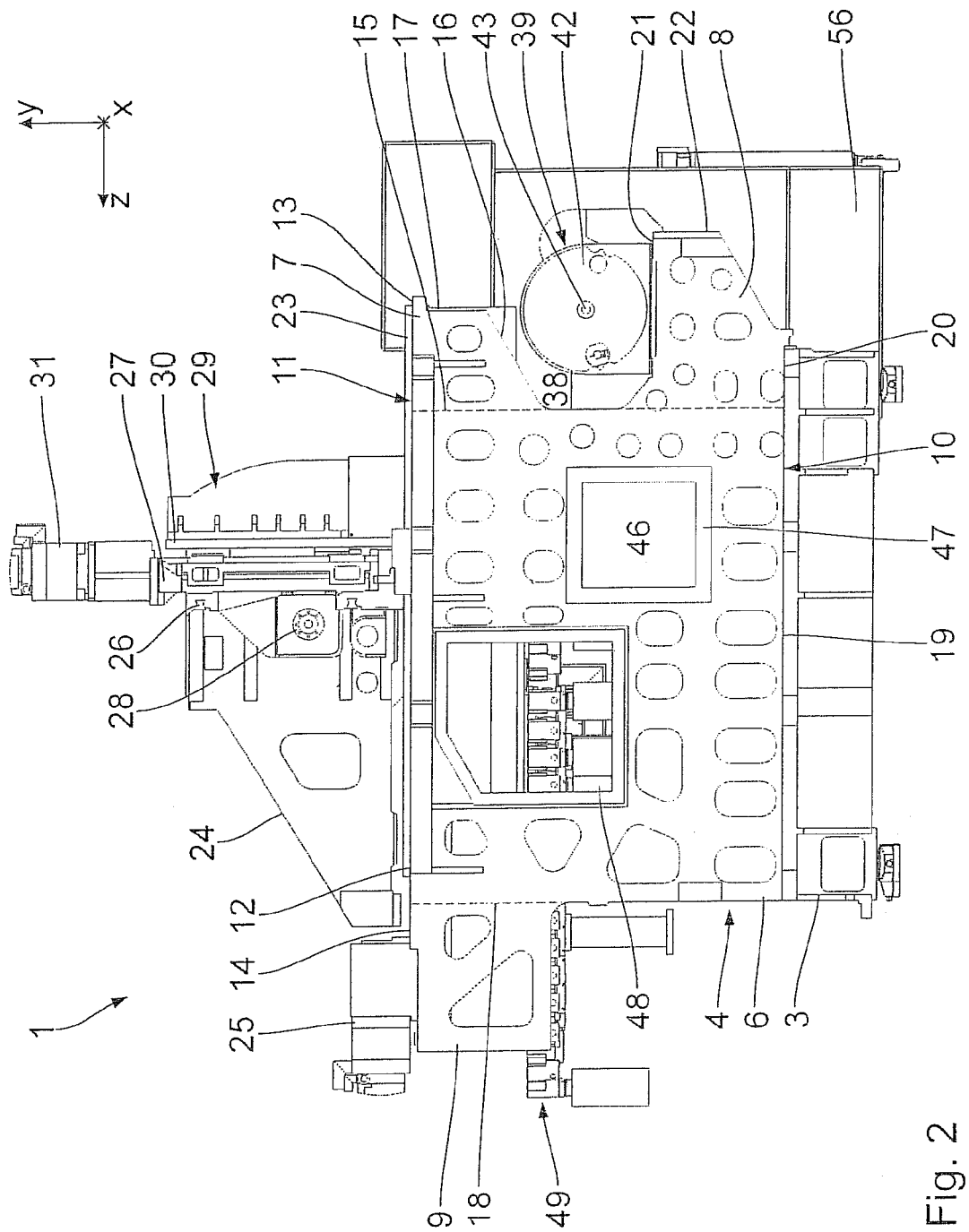
FIG. 2 shows a side view of the machine tool in FIG. 1.
Figure 3:
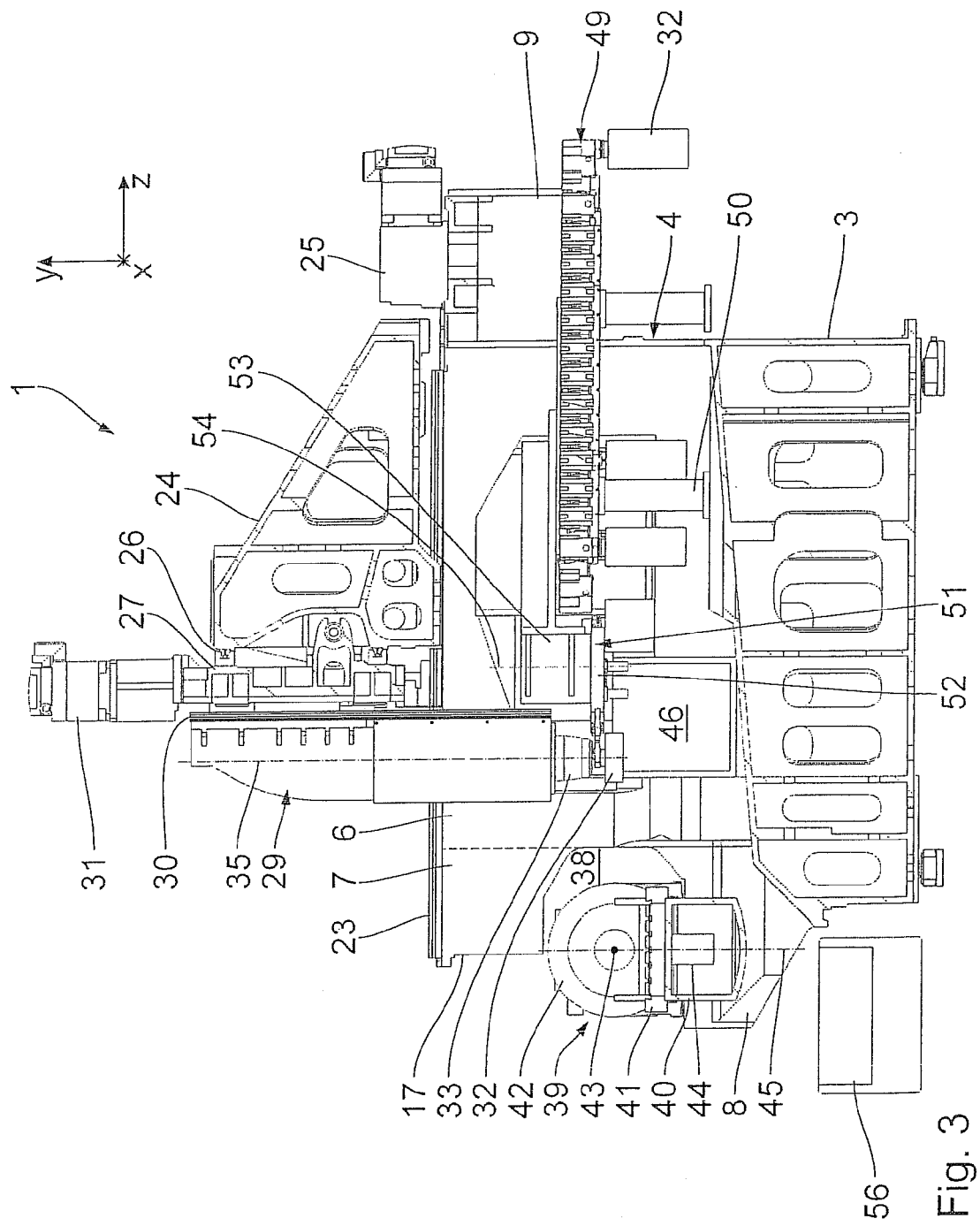
FIG. 3 shows a longitudinal cross section of the machine tool in FIG. 1 running parallel to the side walls.

In the following a first exemplary embodiment of the invention is described with reference to FIGS. 1 to 3. A machine tool 1 for machining metal workpieces 2 comprises a machine bed 3, on which a first side wall 4 and a second side wall 5 which is mirror symmetrical thereto are arranged. The side walls 4, 5 are spaced apart from one another in a horizontal x-direction and run substantially parallel to a y-z-plane, which is defined by a vertical y-direction and a horizontal z-direction. The x-, y- and z-directions form a Cartesian coordinate system.

The side walls 4, 5 comprise respectively a substantially rectangular basic body 6, on which a front overhanging projection 7, a support projection 8 and a rear overhanging projection 9 are formed in one piece. FIG. 2 illustrates by way of example the rectangular basic body 6 of the side wall 4 with dashed lines. Each of the side walls 4, 5 is secured by their side wall bottom side 10 onto the machine frame 3. The side wall top side 11 remains free. Each side wall top side 11 is formed by the associated basic body top side 12, the front overhanging projection top side 13 and the rear overhanging projection top side 14, which are aligned with one another. The front overhanging projections 7 are formed on the respective basic body front side 15 in the region of the basic body top side 12. The front overhanging projections 7 run from the respective basic body 6 in z-direction in a wedge-like manner so that their front overhanging projection lower sides 16 are inclined relative to the x-z-plane. The front overhanging projection front sides 17 run substantially parallel to the x-y-plane. In a corresponding manner the rear overhanging projections 9 on the basic body rear side 18 are fowled in the region of the basic body top side 12. The rear overhanging projections 9 are designed to be substantially rectangular.

Each side wall bottom side 10 is for by the associated basic body bottom side 19 and the support projection bottom side 20, which are in alignment with one another. The support projection 8 of each of the side walls 4, 5 is formed on the basic body front side 15 in the region of the basic body bottom side 19. From the respective basic body 6 the support projections 8 are wedge-shaped in z-direction. The support projection top sides 21 run parallel to the x-z-plane, whereas the support projection bottom sides 20 are inclined relative to the x-z plane in a part area facing the support projection front sides 22. The support projection front sides 22 are substantially parallel to the x-y-plane.

On the side wall top sides 11 z-guiding rails 23 are arranged, which extend substantially over the entire basic body top side 12 and the front overhanging projection top side 13 in z-direction. On the side walls 4, 5 a z-slide 24 is mounted in the form of a bridge and can be moved on the z-guiding rails 23 by means of z-drive motors 25 in z-direction. The z-drive motors 25 are secured respectively on the rear overhanging projection top side 14.

On the z-slide 24 two parallel x-guiding rails 26 running in x-direction are arranged. An x-slide 27 is mounted on the x-guiding rails 26 and can be moved by means of an x-drive motor 28 in x-direction.

On the x-slide 27 a tool spindle 29 is arranged suspended vertically. For this the tool spindle 29 is mounted with two parallel y-guiding rails 30 running in y-direction on the x-slide 27 and can be driven by means of a y-drive motor 31 in y-direction. The tool spindle 29 for mounting a tool 32 comprises a tool mount 33, which is rotary driven by means of a spindle drive motor 34 about a spindle rotary axis 35 running parallel to the y-direction.

The first free spaces 36 lying in y-direction below the front overhanging projections 7 and the second free space 37 between said free spaces 36 form a processing space 38. The processing space 38 is used for positioning and processing workpieces 2. In this processing space 38 the support projections 8 and a workpiece positioning unit 39 are arranged for positioning the workpiece 2 to be processed. The free spaces 36 and 37 forming the processing space 38 are illustrated in FIG. 1.

The workpiece positioning unit 39 is designed in the form of a rotary pivot bridge and comprises a pivot bridge 40 with a rotary disc 41 and two bridge drives 42. The bridge drives 42 are secured onto the support projection top side 21 of the respective support projection 8 and thus arranged in the first free spaces 36. The pivot bridge 40 is connected to the bridge drives 42 and arranged pivotably in the second free space 37 about a first pivot axis 43 denoted an A-axis and running parallel to the x-direction. In the centre of the pivot bridge 40 the rotary disc 41 is mounted. The rotary disc 41 can be pivoted by means of a rotary disc drive 44 about a second pivot axis 45 perpendicular to the pivot bridge 40 and denoted as the B-axis.

The bridge drives 42 are arranged on the support projections 8 such that the first pivot axis 43 lies substantially in the plane formed by the front overhanging projection front sides 17. The first pivot axis 43 can thus be transferred by a suitable movement of the z-slide 24 by the spindle rotary axis 35.

Alternatively, the bridge drives 42 could be secured to the basic body front side 15 or in a corresponding design of the front overhanging projections 7 on their front overhanging projection bottom side 16, whereby the support projections 8 would become superfluous.

The basic bodies 6 of the side walls 4, 5 delimit between them essentially an operating space 46, which can be used for changing tools 32 and/or workpieces 2. To feed workpieces 2 and/or tools 32 into the operating space 46 and remove the latter from the operating space 46 the basic bodies 6 comprises first loading openings 47 and second loading openings 48, which are designed respectively to be aligned with one another. On the machine bed 3 in the region of the basic body rear side 18 a tool magazine 49 designed as a chain magazine is arranged in the operating space 46. The tool magazine 49 extends over the rear overhanging projections 9 and is used for mounting a plurality of different tools 32. The tool magazine 49 can be moved by means of a magazine drive 50 in circumferential direction. For the tool change a tool changer 51 is arranged between the tool magazine 49 and the rotary-pivot bridge 39. The tool changer 51 comprises a changer aim 52, which can be pivoted by means of a changer drive 53 about a changer axis 54 running parallel to the y-direction. The first loading openings 47 are arranged in the area underneath the tool changer 51, the second loading openings 48 in the region of the tool magazine 49.

In the processing space 38 underneath the support projections 8 and the rotary-pivot bridge 39 a separate chip collector 55 is arranged. The chip collector 55 comprises a collecting container 56 with chip conveyors arranged therein that are not shown in more detail, so that chips created during the processing of the workpieces 2 can be caught in the collecting container 56 and transported off in x-direction.

The functioning of the machine tool 1 is as follows:

Firstly, a workpiece 2 to be processed is arranged and secured manually on the rotary disc 41. The tool spindle 29 is moved up to the changer arm 52, which has previously removed a tool 32 from the tool magazine 49 and provides the latter by rotating about the changer axis 54 of the tool spindle 29. The tool spindle 29 removes the tool 32 from the changer aim 52 and begins the processing of the workpiece 2. As the tool spindle 29 can be moved in x-, y- and z-direction, for processing the workpiece 2 three NC-linear axes are provided. Furthermore, as NC-rotational axes the pivot axes 43 and 45 of the rotary-pivot bridge 39 are available for the processing so that a five-axis processing of the workpiece 2 is possible.

By means of the machine tool 1 the turning and milling processing of the workpiece 2 is possible. During turning processing a rotary tool 32 is mounted in the tool spindle 29 and clamped about the spindle rotational axis 35. The rotary disc 41 is operated at a high speed of for example 1,200 Rev/min. By supplying the rotary tool 32 the turning processing is performed. For the milling processing a milling tool 32 is mounted in the tool spindle 29, whereby the latter is rotary driven about the spindle rotational axis 35. The pivot axis 40 is used for positioning the workpiece 2. For this the bridge drives 42 have a high degree of positioning precision and are driven at speeds of a maximum of 35 Rev/min.

Owing to the front overhanging projections 7 the tool spindle 29 can be moved in z-direction, such that the spindle rotary axis 35 overshoots the first pivot axis 43 of the rotary pivot bridge 39. In this way there is a high degree of flexibility during the workpiece processing. The chips which are formed during the processing fall directly into the chip collector 55 and are transported off. The guiding rails 23, 26 and 30 are arranged outside the processing space 38 and are thus protected from dirt, for example from chips.

For the tool change the tool spindle 29 passes to the changer arm 52 the no longer required tool 32. At the same time the changer arm 52 removes the new tool 32 from the tool magazine 49, which had been moved previously into a corresponding transfer position. By rotating the changer arm 52 the new tool 32 of the tool spindle 29 are made available and the no longer required tool is placed into the tool magazine 49. Afterwards the processing of the workpiece 2 can be continued. Once the processing of the workpiece 2 has ended the latter is removed manually from the rotary disc 41 and a new workpiece 2 is placed thereon.

Figure 4:
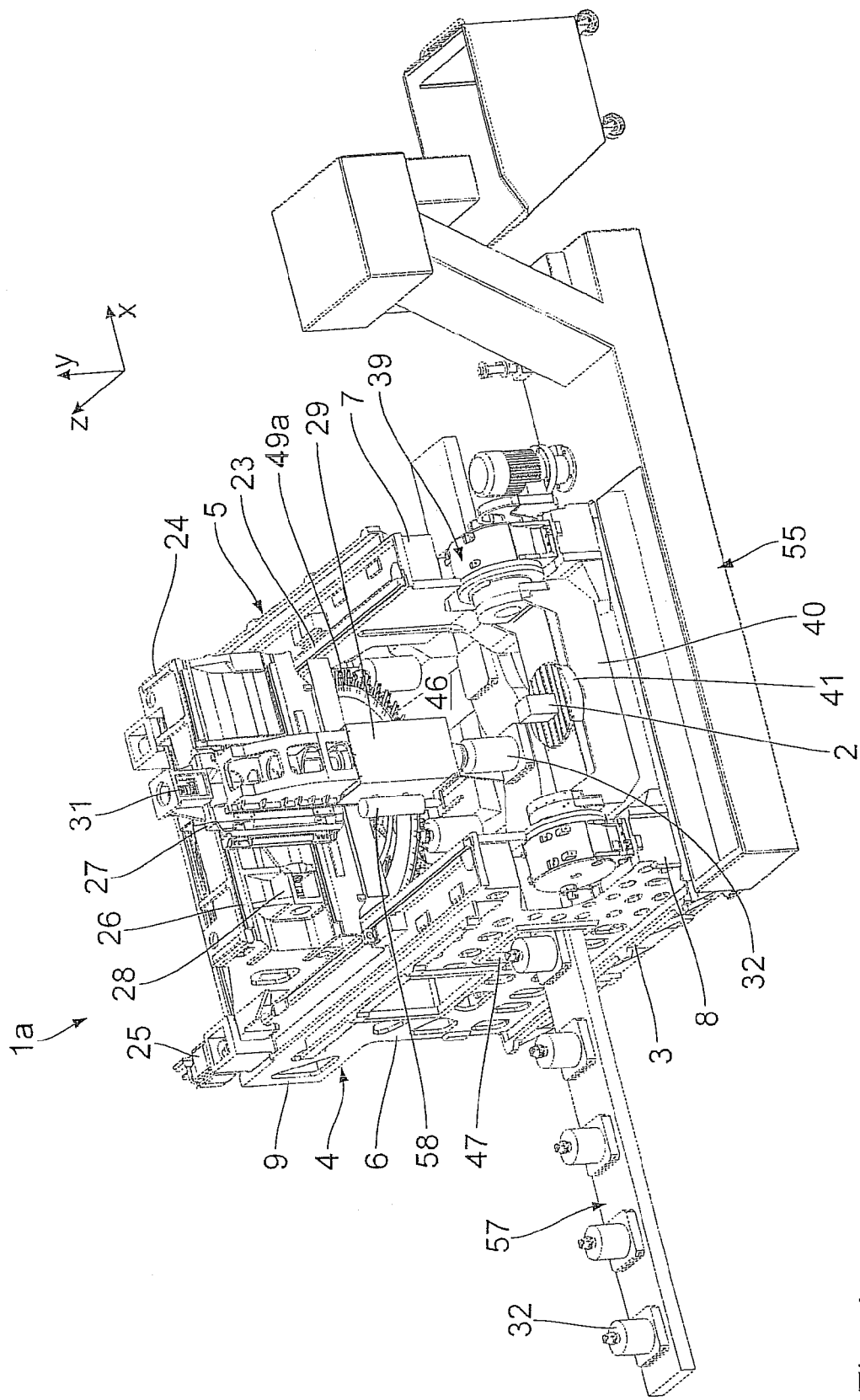
FIG. 4 shows a perspective view of a machine tool according to a second exemplary embodiment.

In the following with reference to FIG. 4 a second exemplary embodiment of the invention is described. Structurally identical parts have been given the same reference numbers as in the first exemplary embodiment, which is referred to here. Structurally different, but functionally similar parts have been given the same reference numbers with an additional a. The machine tool 1a also comprises a transport device 57 for feeding and removing workpieces 2 and/or tools 32. The transport device 57 is designed as a transport belt and passes through the first loading openings 47 and the operating space 46. The tool magazine 49a is designed as a disc magazine. A tool changer is not provided. For gripping the workpieces 2 on the side of the tool spindle 29 a workpiece gripper or a workpiece changer arm 58 is mounted. The workpiece gripper 58 can be designed as a single or double gripper. In one design as a double gripper a workpiece 2 to be processed and a finally processed workpiece 2 can be gripped at the same time. In this way the workpiece changing times can be shortened. By lateral arrangement on the tool spindle 29 the workpiece gripper 58 can be positioned by the machine's linear NC-axes and thus does not require its own NC-axes. The workpiece gripper 58 is designed as a piston cylinder unit and can be retracted with the desired lift in y-direction into a gripping position. This is shown in FIG. 4. The arrangement of the workpiece gripper 58 is such that the latter does not collide with the tool spindle 29 and/or a tool 32.

The workpieces 2 to be processed are firstly transported by means of the transport device 57 up to a workpiece changing position into the operating space 46 and separated there. The workpieces 2 can be transported directly on the transport device 57 or on a transport pallet. A separated workpiece 2 is gripped by means of the workpiece gripper 58 located in the gripping position, placed on the rotary disc 41 and tensioned there in the usual manner. As the workpiece gripper 58 is arranged on the tool spindle 29, the latter can be moved in x-, y- and z-direction together with the tool spindle 29. The workpiece 2 is processed according to the first exemplary embodiment. The workpiece gripper 58 is in an inserted state during the processing, so that the latter does not collide with the workpiece 2 or the tool 32. The finally processed workpiece 2 is picked up again by the workpiece gripper 58 and placed on the transport device 57, which carries the latter away. If the workpiece gripper 58 is designed as a double gripper, at the same time a further workpiece 2 to be processed can be picked up by the transport device 57 and placed on the rotary disc 41. Worn tools 32 are also placed on the transport device 57 and removed. The tool magazine 49a can be fitted with new tools 32, in that the latter are transported by means of the transport device 57 into the operating space 46 and mounted there by the tool spindle 29 and placed directly into the tool magazine 49a. In this way simple pick-up-workpiece and tool handling is possible. All of the movements of the workpieces 2 and the tools 32 are thus performed by the machine's NC-axes. With regard to further functioning reference is made to the first exemplary embodiment.

Figure 5:
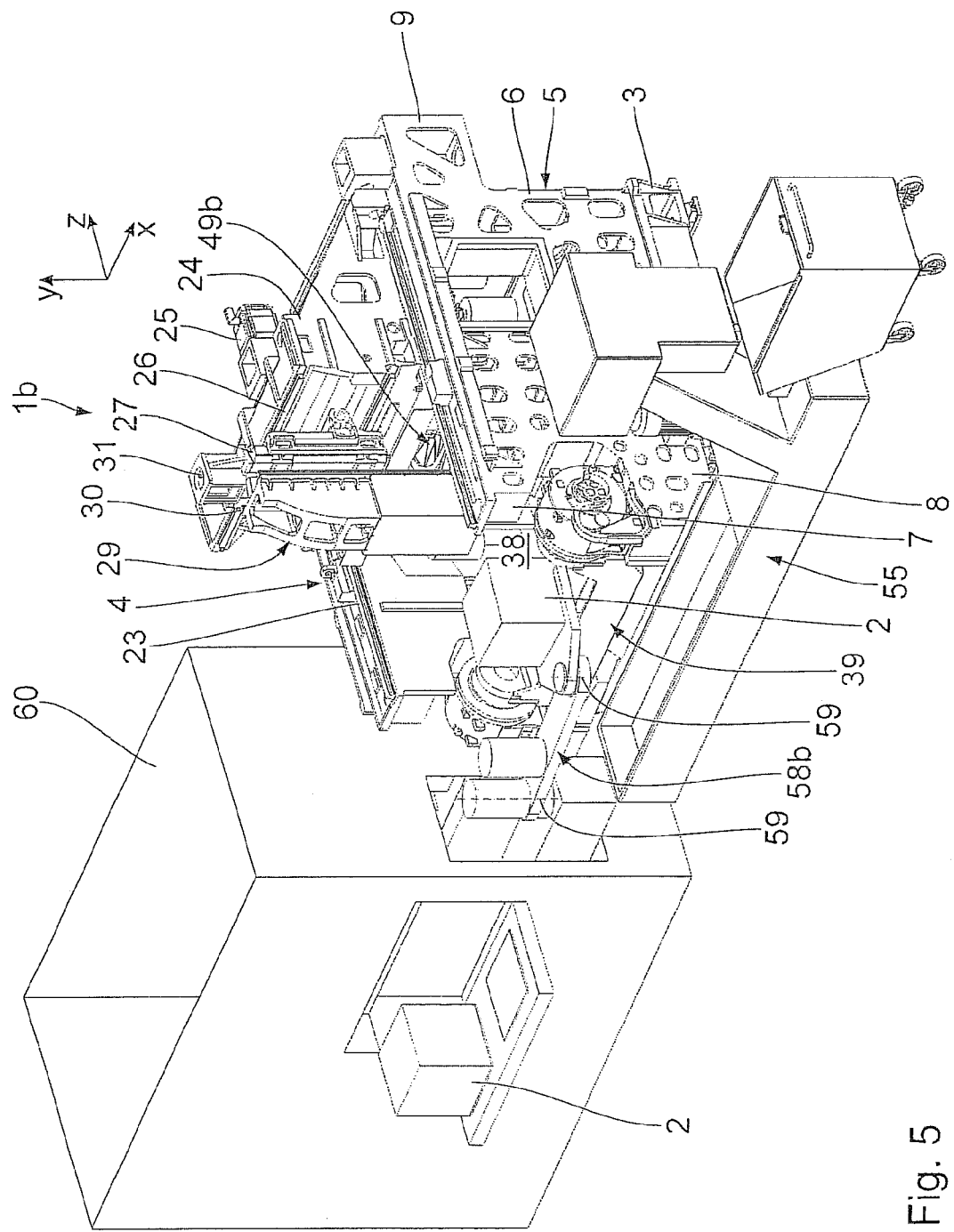
FIG. 5 shows a perspective view of a machine tool according to a third exemplary embodiment.

In the following with reference to FIG. 5 a third exemplary embodiment of the invention is described. Structurally identical parts have been given the same reference numbers as in the first exemplary embodiment, which is referred to here. Structurally different, but functionally similar parts have been given the same reference numbers with an additional b. The workpiece gripper 58b is designed as an articulated arm in machine tool 1b. The articulated arm 58b is pivotable about two gripper axes 59 running parallel to the y-direction and can be moved linearly in x-direction. To supply the workpieces 2 a workpiece magazine 60 is arranged laterally next to the side wall 4. The workpieces 2 are removed by moving and pivoting the articulated arm 58b from the workpiece magazine 60 and arranged on the rotary disc 41. After processing the workpiece 2 is removed in a suitable manner from the rotary disc 41 and put back into the workpiece magazine 60. With regard to the further functioning reference is made to the preceding exemplary embodiments.

Figure 6:
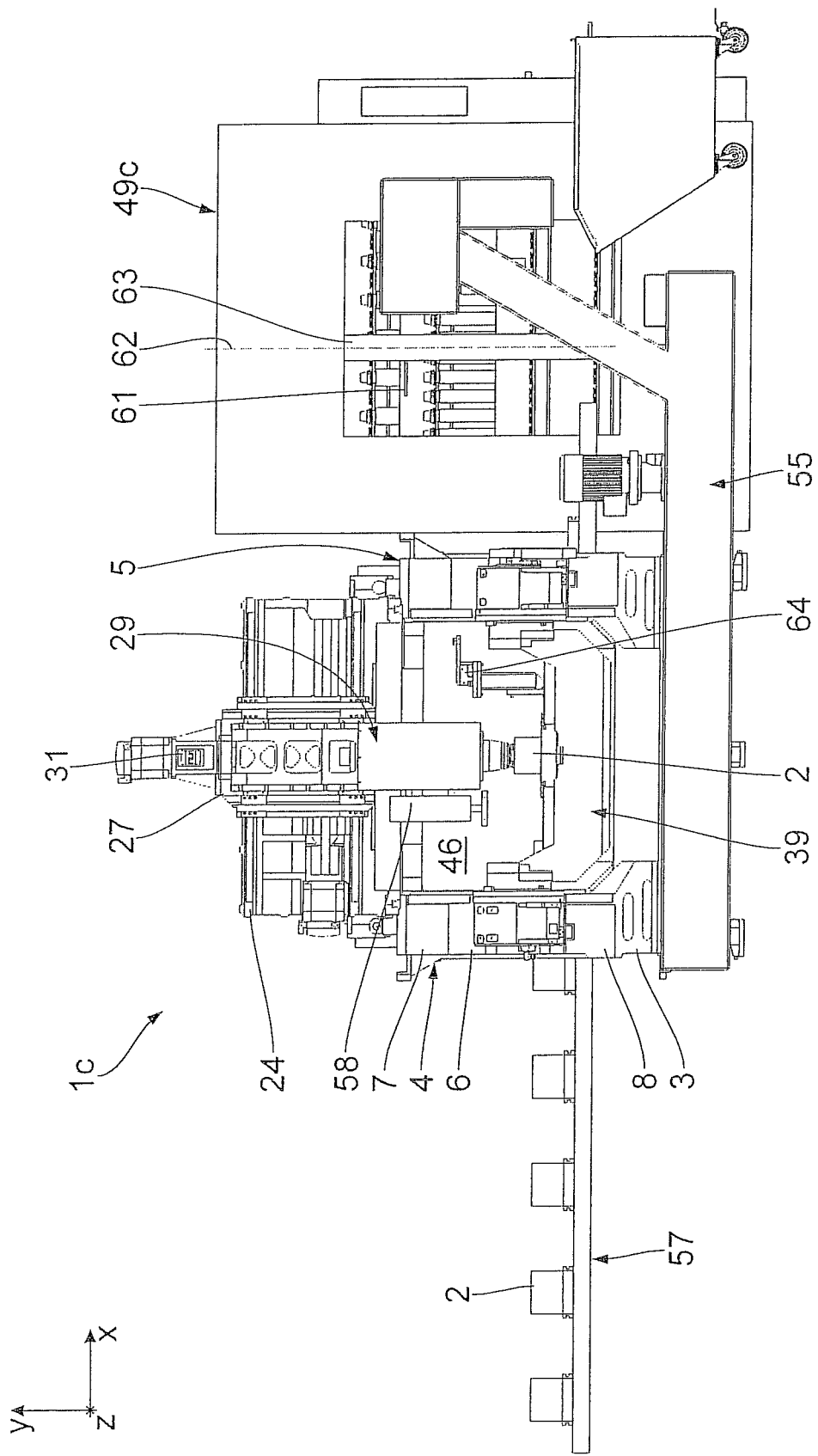
FIG. 6 shows a front view of a machine tool according to a fourth exemplary embodiment.

In the following with reference to FIG. 6 a fourth exemplary embodiment of the invention is described. Identical parts have been given the same reference numbers as in the preceding exemplary embodiments, the description of which is referred to here. Structurally different, but functionally similar parts are given the same reference numbers with an additional c. The tool magazine 49c of the machine tool 1c is designed as a shelf magazine and is arranged laterally next to the side wall 5. The tool magazine 49c comprises a tool transport device with a gripping arm 61. The gripping arm 61 is pivotable about a gripping arm axis 62 running parallel to the y-direction and hinged in y-direction movably on a gripping aim support 63. In the operating space 46 in the region of the second loading opening 48 of the side wall 5 a tool compartment 64 is arranged on the machine bed 3. The tool compartment 64 can be designed as an individual tool holder—as shown in FIG. 6- or as an empty space in a tool magazine. For a tool change the gripping arm 61 removes a new tool 32 from the tool magazine 49c and transports the latter by rotating and moving the gripping aim 61 through the second loading opening 48 to the tool compartment 64, where the tool 32 is stored: The tool spindle 29 is moved to the tool compartment 64, where the latter picks up the stored tool 32. Afterwards, by means of the tool 32 the workpiece processing is performed. A tool 32 that is no longer required is placed in a suitable manner back in the tool magazine 49c. In principle the storage capacity of the tool magazine 49c can be increased by an unlimited amount. The gripping of the workpieces 2 is performed by means of the workpiece gripper 58, which is arranged according to the second exemplary embodiment laterally on the tool spindle 29. With respect to the further functioning reference is made to the preceding exemplary embodiments.

Figure 7:
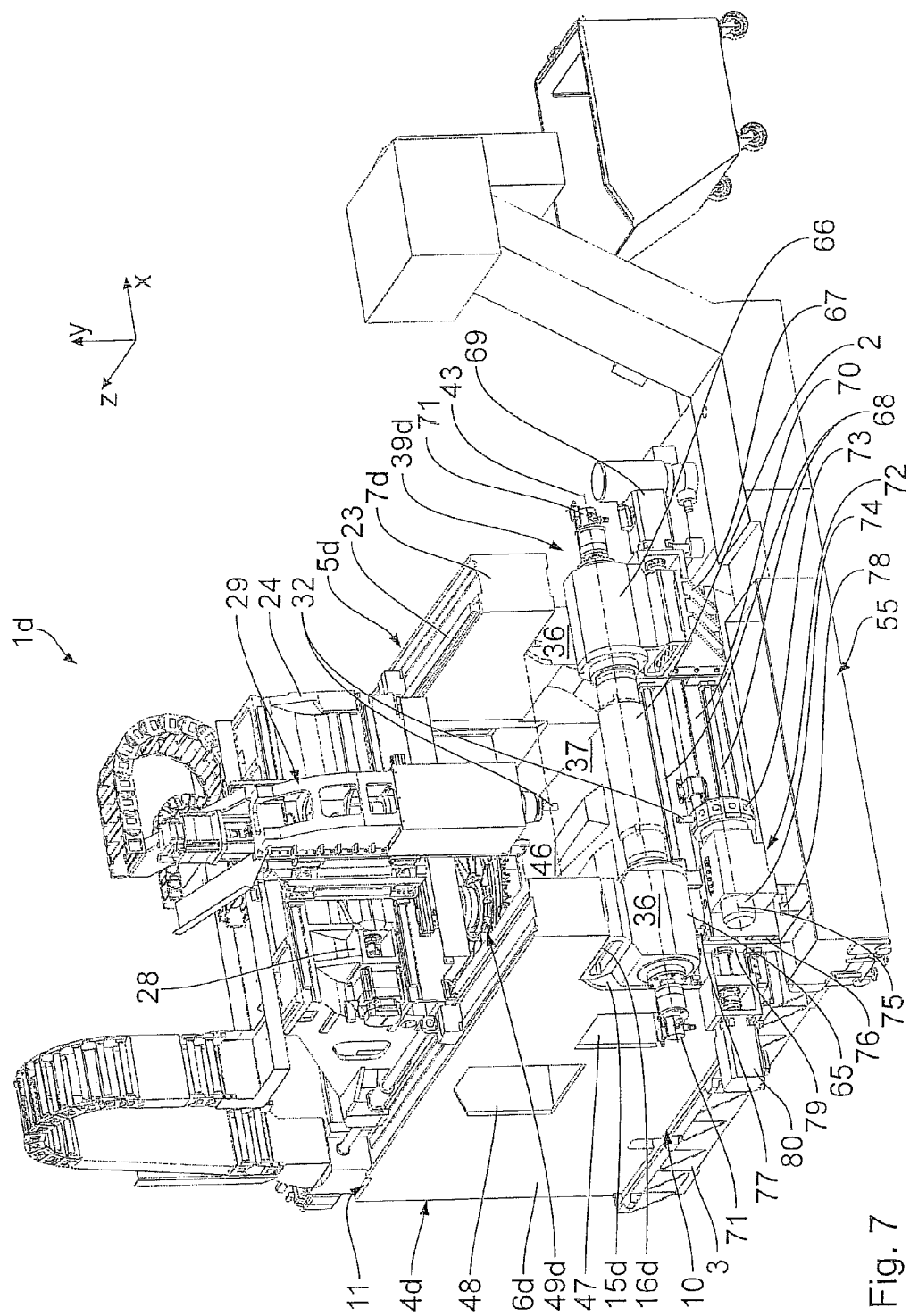
FIG. 7 shows a perspective view of a machine tool according to a fifth exemplary embodiment.
Figure 8:
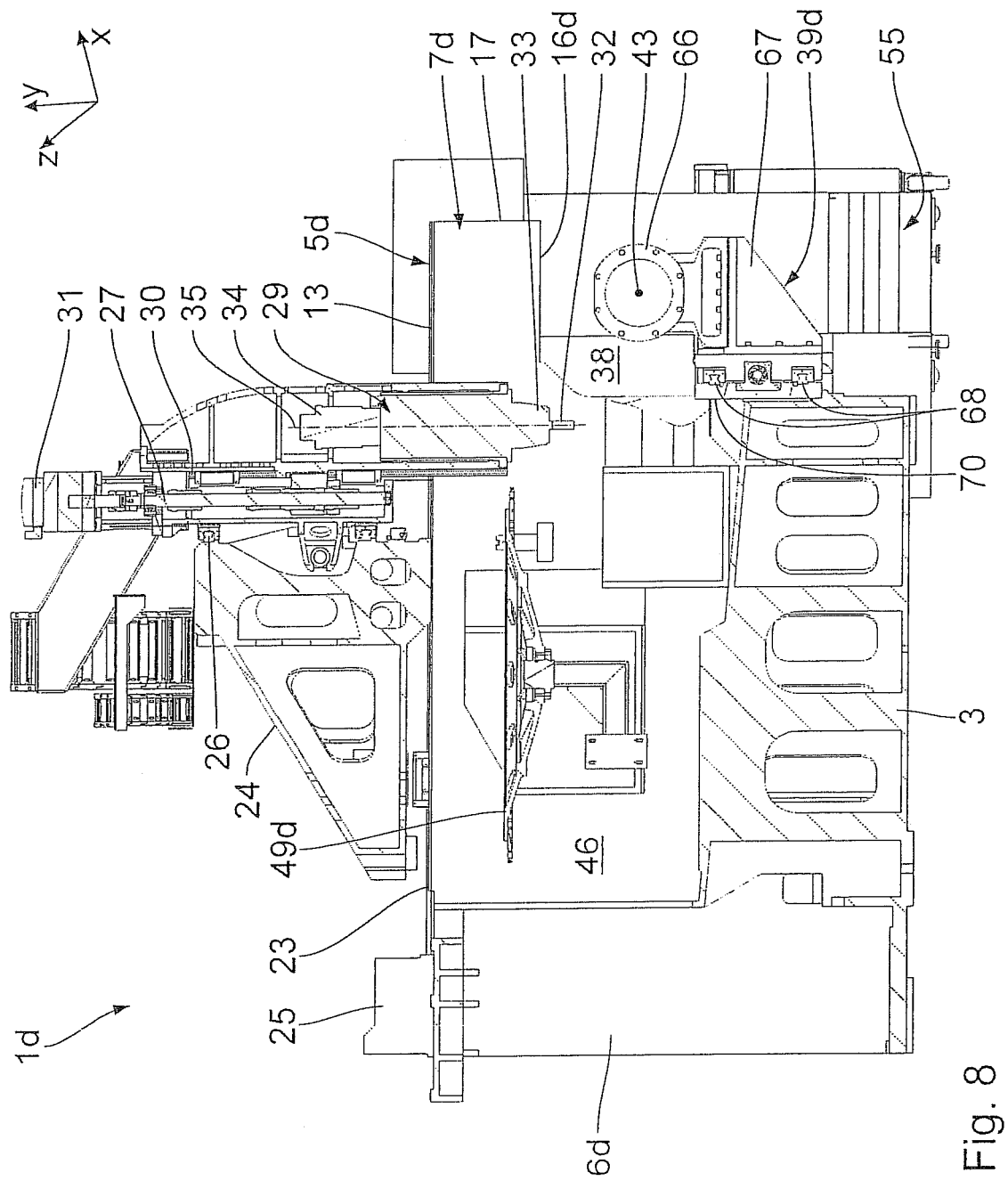
FIG. 8 shows a longitudinal cross section of the machine tool in FIG. 7 running parallel to the side walls.

In the following with reference to FIGS. 7 and 8 a fifth exemplary embodiment of the invention is described. Identical parts are given the same reference numbers as in the preceding exemplary embodiments, the description of which is referred to here. Structurally different, but functionally similar parts are given the same reference numbers but with additional d. The workpiece positioning unit 39d of the machine tool 1d is set up for processing shaft-like and/or flange-like workpieces 2. For this a first workpiece mount 65 designed as a workpiece spindle is secured onto the front overhanging projection bottom side 16d running parallel to the x-z-plane of the side wall 4d. A second workpiece mount 66 designed as a workpiece spindle is secured onto a second x-slide 67. The x-slide 67 is mounted on second x-guiding rails 68 and can be moved by means of a second x-drive motor 69 in x-direction. The second x-guiding rails 68 are secured onto a machine bed front side 70 and onto the basic body front sides 15d, so that the latter extends over the entire processing space 38. The workpiece spindles 65, 66 comprise respectively an associated workpiece spindle drive motor 71, so that a workpiece 2 mounted in the workpiece spindles 65, 66 is rotary driven around the pivot axis 43. In addition to the tool spindle 29 a tool revolver 72 is provided with a revolver disc 73 and a revolver drive motor 74. The revolver disc 73 is pivotable by means of the revolver drive motor 74 about a revolver axis 75 running parallel to the x-direction. The tool revolver 72 is arranged on a y-slide 76, which can be moved on second y-guiding rails 77 by means of a second y-drive motor 78 in y-direction. The second y-guiding rails 77 are arranged on a third x-slide 79, which can be driven on the second x-guiding rails 68 by means of a third x-drive motor 80 in x-direction. The tool revolver 72 is arranged on the side of the second x-slide 67 facing the first workpiece spindle 65.

The feeding and removal of the workpieces 2 is performed manually. Shaft-like workpieces 2 are mounted and rotary driven in both workpiece spindles 65, 66. The processing is performed by means of the tool spindle 29 and/or the tool revolver 72. The tool revolver 72 can be moved for this in the processing space 38 underneath the workpiece 2 and the first workpiece spindle 65 randomly in x- and y-direction. By means of the movable second workpiece spindle 66 workpieces 2 of varying lengths can be mounted. The tool revolver 72 is designed to be extremely rigid owing to its short lever arms. Accordingly, the turning processing of the shaft-like workpieces 2 is preferably performed by the tool revolver 72, as in this way roundnesses and coaxialities of the individual shaft-like sections can be obtained with tolerances in the micrometer range. To complete the processing of the workpieces 2 preferably the tool spindle 29 is used, which can be positioned via the three linear NC-axes in x-, y- and z-direction. Without re-clamping the workpiece 2 by means of the tool spindle 29 different bore, thread and milling processes are possible. Furthermore, by means of the interpolation of the three linear NC-axes in connection with the pivot axis 43 also complicated prismatic and/or spherical geometries of the workpiece 2 can be produced.

Furthermore, flange-like workpieces 2 can be processed on both sides. For this the workpiece 2 is firstly mounted in the first workpiece spindle 65 and processed by means of the tool spindle 29 and/or the tool revolver 72. Afterwards the second workpiece spindle 66 is moved up to the first workpiece spindle 65 and the workpiece 2 is transferred to the second workpiece spindle 66. The workpiece 2 can be processed by means of the tool spindle 29 and/or the tool revolver 72 on the previously tensioned side. At the same time a new workpiece 2 can be clamped and processed in the first workpiece spindle 65. If workpieces 2 are mounted in both workpiece spindles 65, 66, the tool spindle 29 can process one and the tool revolver 72 can process the other workpiece 2.

By means of the tool revolver 72 the workpieces 2 can be rotationally processed, whilst the tool spindle 29 can rotary drive a tool 2 and can thus perform boring processing on the fixed workpiece 2. With regard to the further functioning reference is made to the preceding exemplary embodiments.

Figure 9:
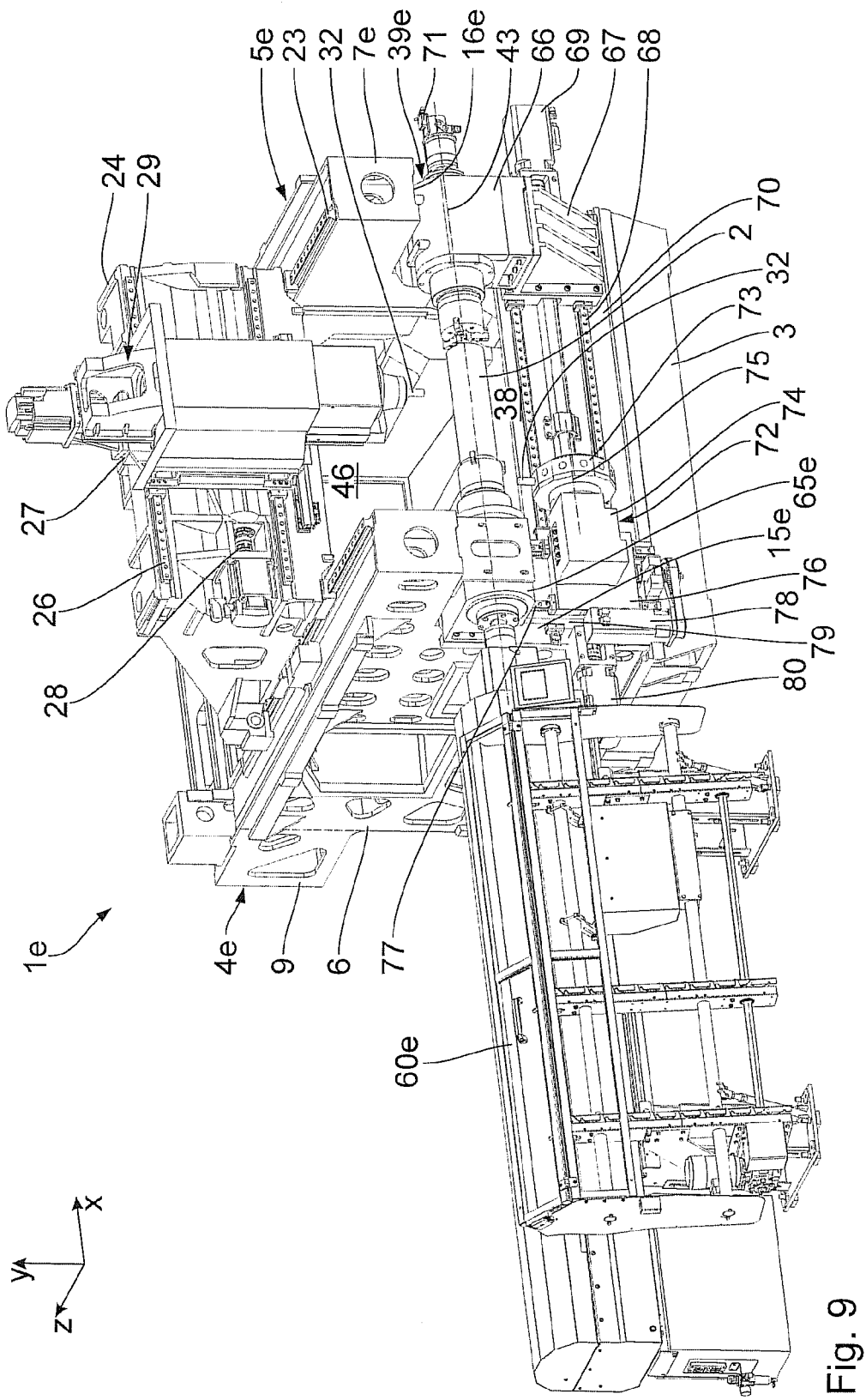
FIG. 9 shows a perspective view of a machine tool according to a sixth exemplary embodiment.

In the following with reference to FIG. 9 a sixth exemplary embodiment of the invention is described. Identical parts have been given the same reference numbers as in the preceding exemplary embodiments, the description of which is referred to here. Structurally different, but functionally similar parts are given the same reference numbers but with an additional e. The machine tool 1e comprises in addition to the fifth exemplary embodiment a workpiece magazine 60e, which can supply the shaft-like workpieces 2 through the first workpiece spindle 65e to the latter and the second workpiece spindle 66 and can remove them in a corresponding manner. The workpiece magazine 60e thus allows the automatic supply and removal of workpieces 2. The first workpiece spindle 65e unlike the preceding exemplary embodiment is secured onto the basic body front side 15e. With respect to the additional functioning reference is made to the preceding exemplary embodiments.

Figure 10:
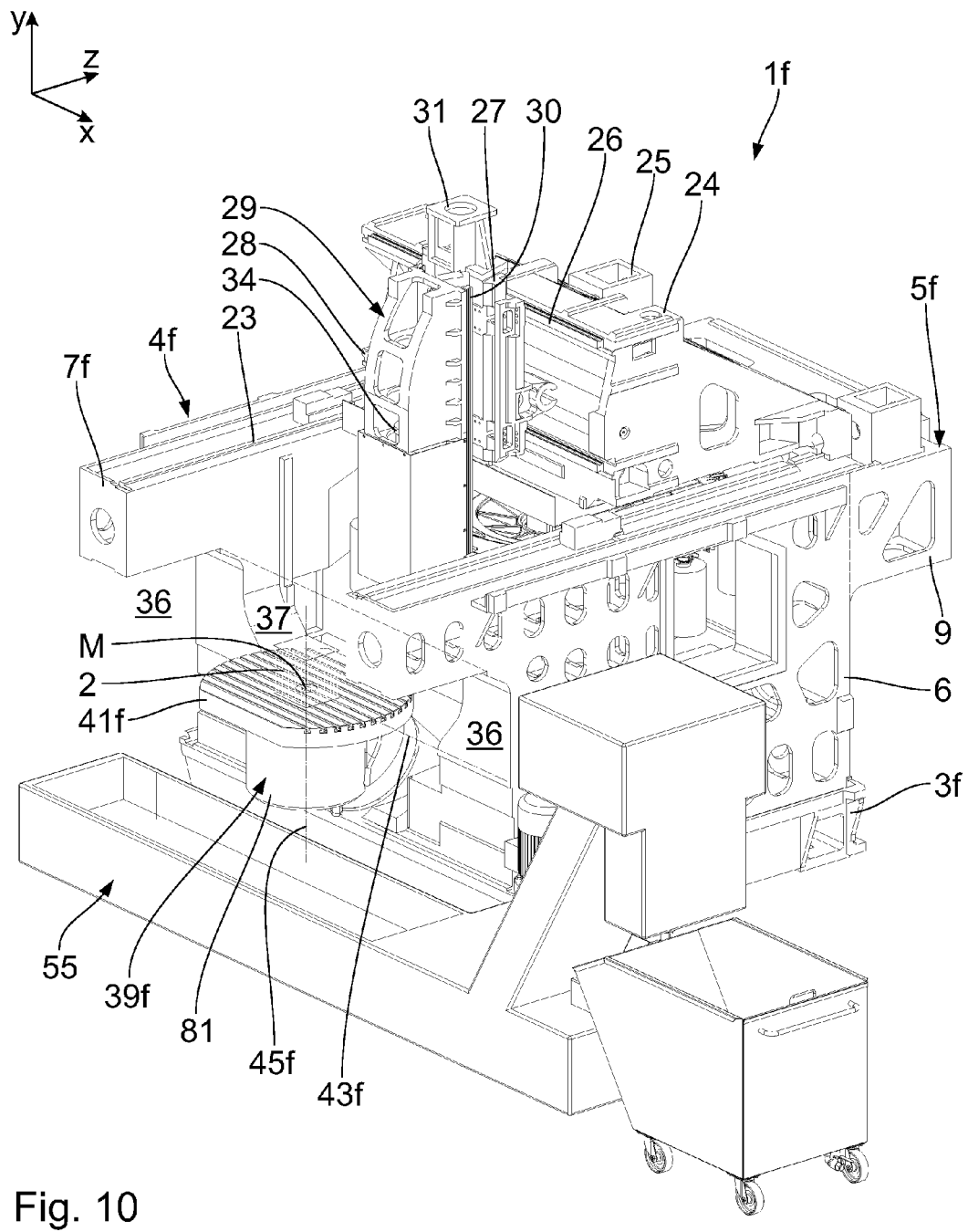
FIG. 10 shows a perspective view of a machine tool according to a seventh exemplary embodiment.
Figure 11:
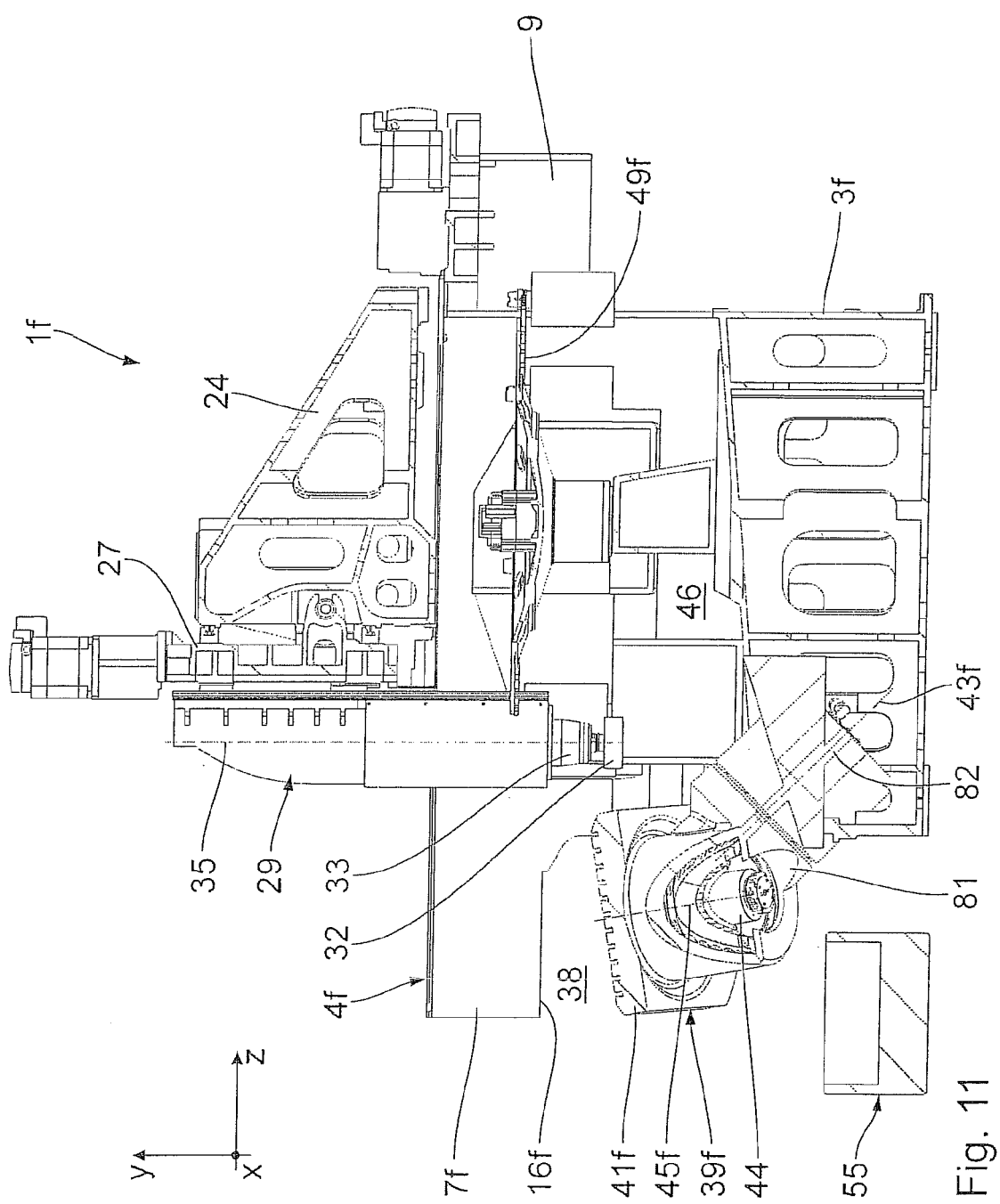
FIG. 11 shows a longitudinal section through the machine tool in FIG. 10 running parallel to the side walls.

In the following with reference to FIGS. 10 and 11 a seventh exemplary embodiment of the invention is described. Identical parts have been given the same reference numbers as in the preceding exemplary embodiments, the description of which is referred to here. Structurally different, but functionally similar parts are given the same reference numbers but with additional f. The workpiece positioning unit 39f of the machine tool 1f is designed as twin-axis table. On the machine bed 3f a pivot part 81 is arranged such that the first pivot axis 43f runs in the y-z-plane inclined by 45° relative to the y-direction and extends into the processing space 38. The pivoting of the pivot part 81 about the first pivot axis 43f is performed by means of a pivot drive 82 integrated into the machine bed 3f. On the pivot part 81 the rotary disc 41f is arranged such that the second pivot axis 45f with the first pivot axis 43f encloses an angle of 135°. In the position shown in FIG. 10 the second pivot axis 45f thus runs parallel to the y-direction. The rotary disc 41f is arranged essentially in the processing space 38 underneath the front overhanging projections 7f. The rotary disc drive 44 is integrated into the pivot part 81.

The supply and removal of workpieces 2 is performed manually. During the processing the workpiece 2 can if necessary be pivoted about the pivot axes 43f and 45f and processed by means of a tool 32 mounted in the tool spindle 29. As the z-slide 24 can be moved up to the end of the front overhanging projections 7f, the tool spindle 29 with its spindle rotary axis 35 can overshoot the second pivot axis 45f in a random position about the first pivot axis 43f. This ensures a high degree of flexibility during the workpiece processing. With the twin axis table also large workpieces 2 with a diameter of 800 mm and more can be processed, as there is no lateral delimitation. As the pivot axes 43f and 45f meet in the middle point M of the rotary disc 41 the pivoting of the workpieces 2 takes place with short movements. The achievable accelerations on positioning the workpieces 2 are also extremely high. With regard to further functioning reference is made to the preceding exemplary embodiments.

Figure 12:
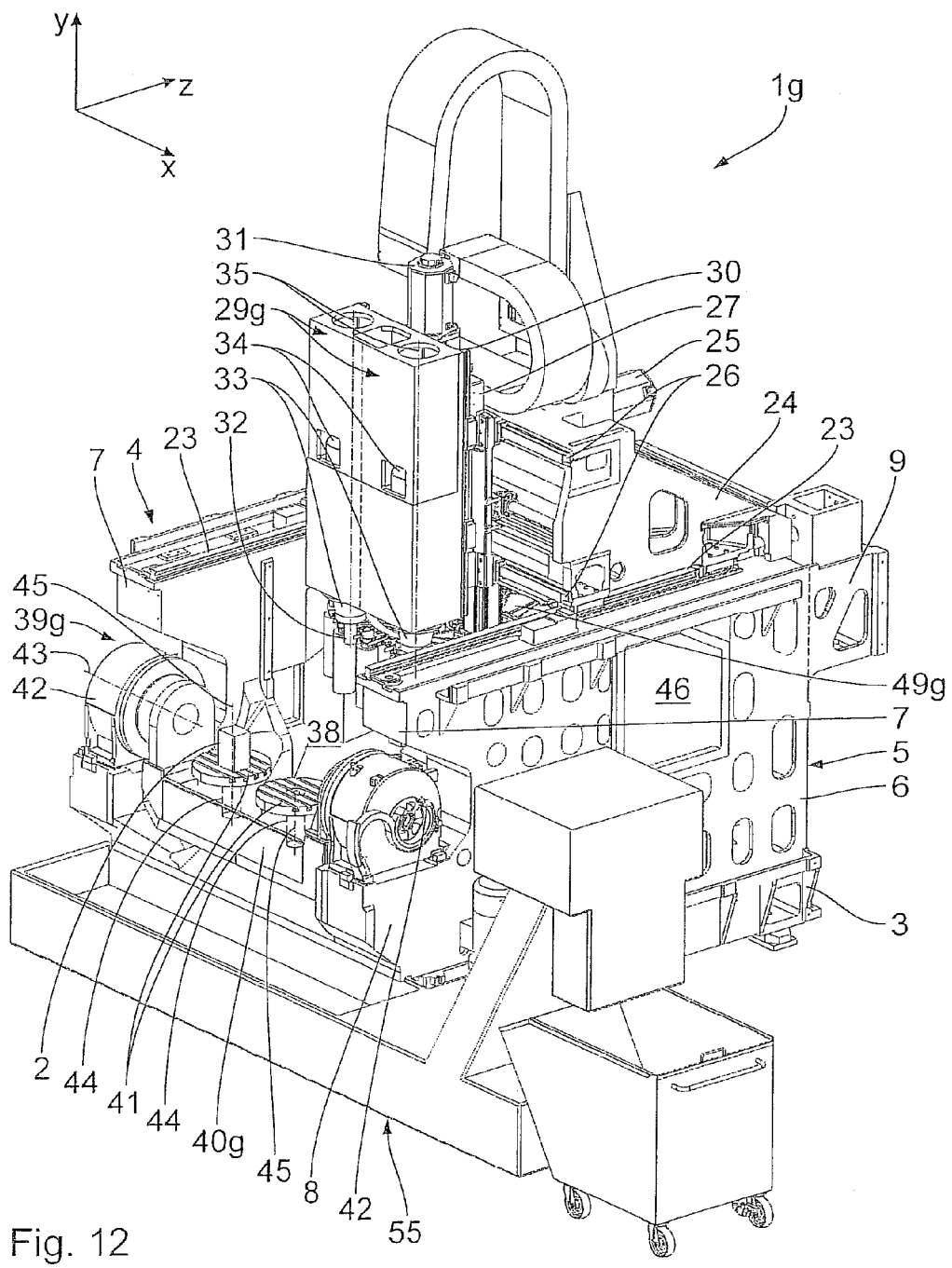
FIG. 12 shows a perspective view of a machine tool according to an eighth exemplary embodiment.

In the following with reference to FIG. 12 an eighth exemplary embodiment is described. Identical parts have been given the same reference numbers as in the preceding exemplary embodiments, which are referred to here. Structurally different but functionally similar parts have been given the same reference numbers with an additional g. The machine tool 1g is designed to have a double spindle and comprises two tool spindles 29g arranged next to one another, which can be moved together in y-direction. The workpiece positioning unit 39g is designed according to the first to third exemplary embodiment as the rotary-pivot bridge and comprises two rotary discs 41 arranged next to one another. By means of the machine tool 1g the simultaneous processing of two workpieces 2 is possible. With regard to further functioning reference is made to the preceding exemplary embodiments.

Figure 13:
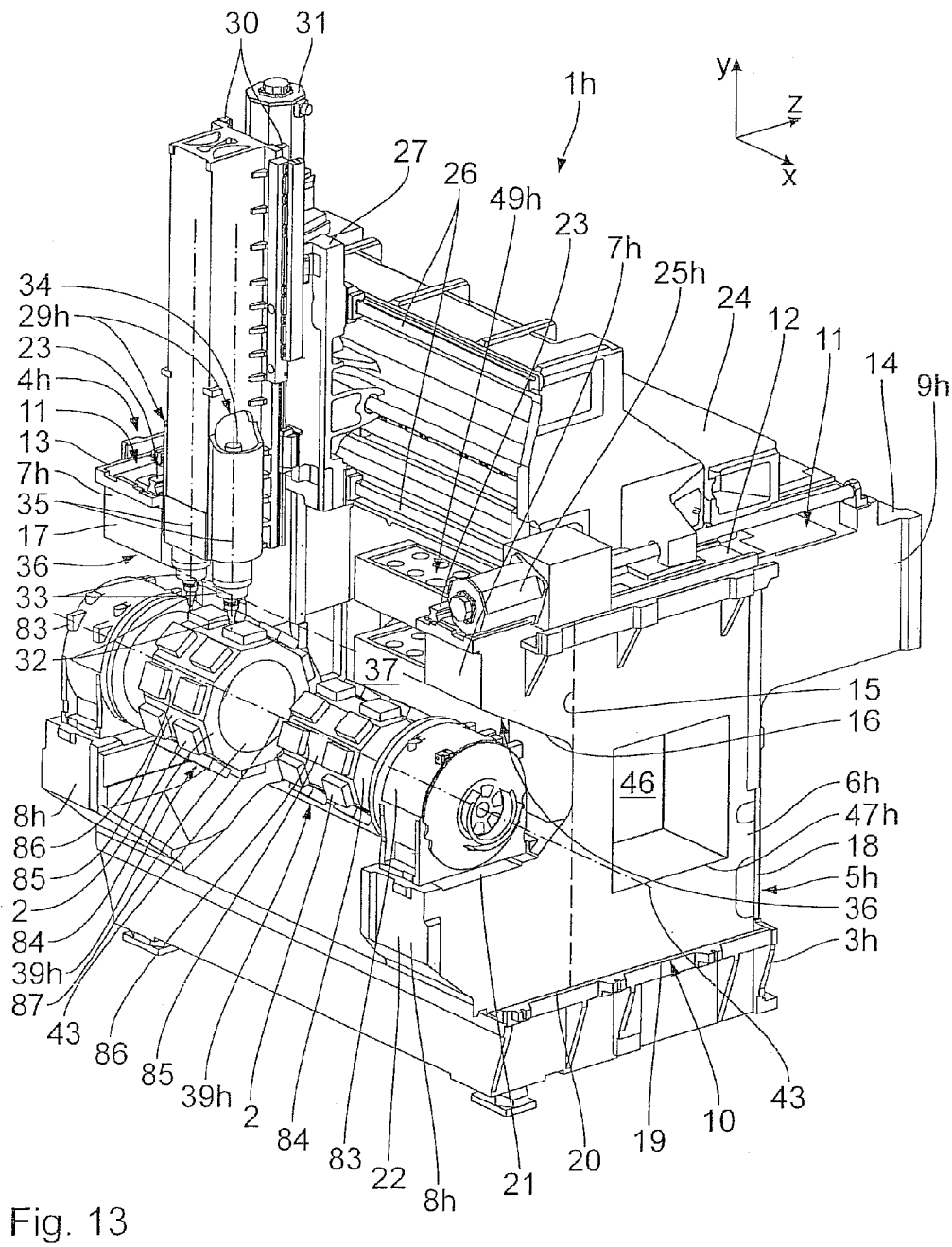
FIG. 13 shows a perspective view of a machine tool according to a ninth exemplary embodiment.
Figure 14:
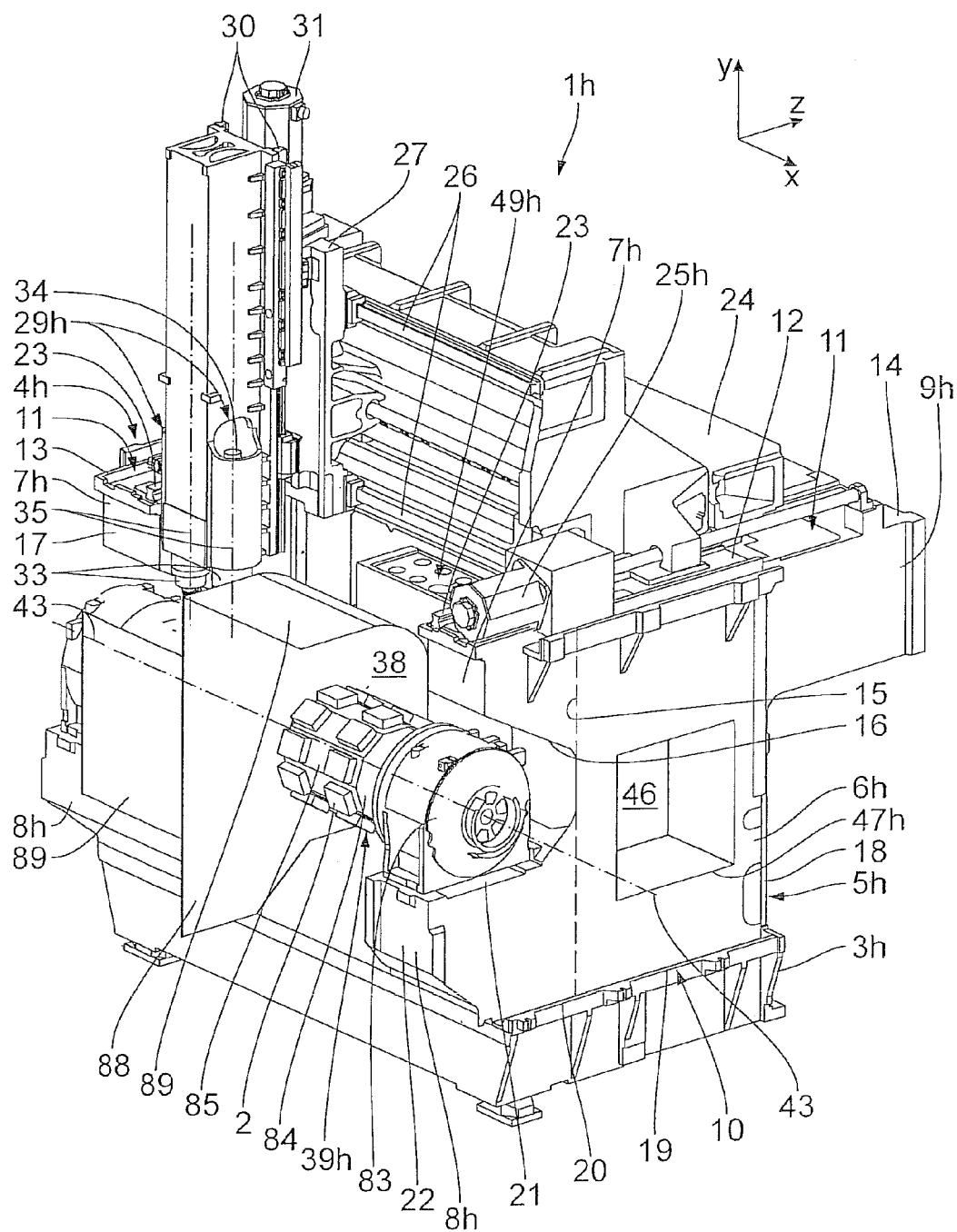
FIG. 14 shows a perspective view of the machine tool in FIG. 13 with screens for the workpiece processing.

In the following with reference to FIGS. 13 and 14 a ninth exemplary embodiment of the invention is described. Identical parts have been given the same reference numbers as in the preceding exemplary embodiments, which are referred to here. Structurally different but functionally similar parts have been given the same reference numbers with an additional h. The machine tool 1h is designed to have a double spindle and comprises two adjacent tool spindles 29h, which can be moved together in y-direction. The machine tool 1h comprises two workpiece positioning units 39h, which comprise respectively a positioning drive 83 and a workpiece carrier 84 with a polygonal cross section. The positioning drives 83 are secured onto the support projections 8h. The workpiece carriers 84 are connected respectively with one of the positioning drives 83 and can be pivoted independently of one another about the common pivot axis 43. The workpiece carriers 84 extend in the direction of the processing space 38 and face one another. Each workpiece carrier 84 has several polygonal sides 85 on its outer circumference. On each polygon side 85 two workpiece mounts 86 are arranged adjacent to one another in x-direction. The number and the spacing of the workpiece mounts 86 correspond to the number and the spacing of the tool spindles 29h, so that two workpieces 2 can be processed simultaneously. The workpiece mounts 86 are designed for example as a clamping device. To optimize the weight the workpiece carriers 84 comprise respectively a cylindrical bore 87. The workpiece carriers 84 are thus designed as hollow cylinders with a polygonal external circumference in cross section. Between the workpiece positioning units 39h a perpendicular dividing wall 88 is arranged and secured onto the machine bed 3h. On each side of the dividing wall 88 a shutter-like covering 89 for the workpiece carriers 84 is guided.

By means of the tool spindles 29h two workpieces 2 arranged on a polygon side 85 are processed at the same time. The workpiece carrier 84 is pivoted successively by means of the associated positioning drive 83, so that gradually the workpieces 2 arranged on the additional polygon sides 85 are processed. Once all the workpieces 2 have been processed, the tool spindles 29h move to the additional workpiece carrier 84, which has in the meantime been loaded with workpieces 2. The cover 89 of this workpiece carrier 84 is closed so that the processing of workpieces 2 can be continued. Meanwhile this the cover 89 of the workpiece carrier 84 with the already processed workpieces 2 is opened, so that the latter can be removed. After this the workpiece carrier 84 is loaded again with the workpieces 2 to be processed. In this way the continual processing of workpieces 2 and high productivity of the machine tool 1h are ensured. By means of the front overhanging projections 7h a high degree of flexibility is provided for the processing of the workpieces 2, in particular the latter can be processed from different sides. If the tools 32 are worn the latter can be placed into the tool magazine 49h and new tools 32 can be taken from the latter. With respect to the further functioning reference is made to the preceding exemplary embodiments.

In principle for all of the exemplary embodiments the machine tools 1, 1a to 1h are modular in structure. The individual modules machine bed 3, 3f, 3h, side walls 4, 4d, 4e, 4f, 4h, 5, 5d, 5e, 5f, 5h, slide 24, 27, tool spindle 29, 29g, 29h, workpiece positioning units 39, 39d, 39e, 39f, 39g, 39h, tool magazine 49, 49a to 49h, chip collector 55, transport device 57 and workpiece gripper 58, 58b can be combined as required in any way. In this way the machine tools 1a to 1h can be configured for different processes, for example turning, milling, grinding, thread boring or toothing. Owing to the basic structure of the machine tools 1, 1a to 1h with a stand foamed from the machine bed 3, 3f, 3h and the side walls 4, 4d, 4e, 4f, 4h, 5, 5d, 5e, 5f, 5h and a portal arrangement of the slides 24, 27 and the tool spindle 29, 29g, 29h a high degree of stability is achieved along with a high degree of robustness. In addition, by means of the tool spindle 29, 29g, 29h pick-up-tool handling is possible. If a workpiece gripper 58 or a gripping tool is arranged on the tool spindle 29, 29g, 29h, in addition a pick-up-workpiece handling is possible. The movement of the slides 24, 27 and the tool spindle 29, 29g, 29h can be performed by recirculating ball spindles and/or linear drives. By means of the front overhanging projections 7, 7d to 7f, 7h a freely accessible processing space 38 is produced, which can be adjusted by variation of the length of the front overhanging projections 7, 7d to 7f, 7h in broad limits. In the processing space 38 if necessary different workpiece positioning units 39, 39d, 39e, 39f, 39g, 39h can be arranged, by means of which the machine tools 1, 1a to 1h can be set up for a range of different processing tasks.

What is claimed is:

1. A machine tool for processing workpieces, the machine tool comprising:

a machine bed, two side walls,
 which side walls are arranged to be substantially parallel to one another,
 which side walls are arranged respectively with a side wall bottom side on the machine bed, and,
 which side walls respectively have a side wall top side, a z-slide,
 which z-slide is arranged in the region of the side wall top side on the side walls, and,
 which z-slide can be moved by means of a z-drive motor in a horizontal z-direction on the side walls, an x-slide,
 which x-slide is arranged on the z-slide, and,
 which x-slide can be moved by means of an x-drive motor in a horizontal x-direction on the z-slide, and, a rotary-driven tool spindle for mounting a tool,
 which spindle is arranged suspended on the x-slide, and,
 which spindle can be moved by means of a y-drive motor in a vertical y-direction on the x-slide, wherein the side walls each comprise a basic body, a support projection, and a front overhanging projection arranged thereon, and wherein:
 each of the front overhanging projections is in alignment with the associated basic body so that the z-slide can be moved on both the respective overhanging projection and the respective basic body, and wherein first spaces are formed directly underneath the front overhanging projections, and wherein a second space lying between said first free spaces forms a processing space for processing a workpiece with the tool mounted on the tool spindle, and the machine tool further comprising:

at least one workpiece positioning unit for positioning the workpiece to be processed, the at least one workpiece positioning unit being positioned in the processing space and in the first spaces, each support projection being arranged directly below a respective one of the front overhanging projections, the at least one workpiece positioning unit is supported on an upper surface of each of the support projections, said upper surfaces being spaced from one another in the x-direction.

2. A machine tool according to claim 1, wherein each of the front overhanging projections together with the associated basic body forms the respective side wall top side, and the z-slide is arranged movably on the latter.

3. A machine tool according to claim 1, wherein the at least one workpiece positioning unit is configured to pivot the workpiece about a horizontal axis.

4. A machine tool according to claim 1, wherein each of the front overhanging projections is designed in one piece with the associated basic body.

5. A machine tool according to claim 1, wherein at least one of the side walls comprises at least one feed opening.

6. A machine tool according to claim 5, wherein each of the side walls comprises said at least one feed opening, and wherein said at least one feed opening of one of the side walls is designed to be in alignment with said at least one feed opening of the other of the side walls.

7. A machine tool according to claim 1, wherein a respective z-guide rail is arranged on each of the side wall top sides for guiding the z-slide in the z-direction.

8. A machine tool according to claim 1, wherein the at least one workpiece positioning unit is designed as a rotary-pivot bridge, and a respective bridge drive is arranged on each of the support projections.

9. A machine tool according to claim 1, wherein the at least one workpiece positioning unit comprises two workpiece positioning units, wherein each said support projection upper surface supports a respective one of said two workpiece positioning units, wherein each workpiece positioning unit is provided with a positioning drive and a polygonal workpiece support.

10. A machine tool according to claim 9, wherein each positioning drive is arranged on one of the support projections, and the polygonal workpiece supports extend concentrically on a horizontal pivot axis of the positioning drives into the processing space.

11. A machine tool according to claim 9, wherein the workpiece supports can be pivoted independently of one another by means of the positioning drives about a joint, horizontal pivot axis.

12. A machine tool according to claim 9, wherein on each polygon side of the polygonal workpiece supports, plural workpiece mounts are arranged next to one another, wherein the number of workpiece mounts per polygon side corresponds to the number of tool spindles of the machine tool.

13. A machine tool according to claim 1, wherein each of the support projections is designed to be in one piece with the associated basic body.

14. A machine tool according to claim 1, wherein the at least one workpiece positioning unit comprises:

a first workpiece mount that is arranged in the region of one of the front overhanging projections; and, a second workpiece mount that is arranged spaced in the x-direction from the first workpiece mount and in alignment with the first workpiece mount.

15. A machine tool according to claim 14, wherein a dividing wall is provided between the first and second workpiece mounts.

16. A machine tool according to claim 1, further comprising a second tool spindle.

17. A machine tool according to claim 1, wherein the at least one workpiece positioning unit is in the form of a rotary-pivot bridge that pivots about a horizontal axis.

18. A machine tool according to claim 1, wherein a separate chip collector is arranged underneath the at least one workpiece positioning unit.

19. A machine tool according to claim 1, wherein a tool magazine is arranged between the side walls.

* * * * *